(12) United States Patent
Hecht et al.

(10) Patent No.: US 9,901,992 B2
(45) Date of Patent: Feb. 27, 2018

(54) RAMPING INSERT AND HIGH-FEED MILLING TOOL ASSEMBLY

(71) Applicant: Iscar, Ltd., Tefen (IL)

(72) Inventors: Gil Hecht, Nahariya (IL); Osama Atar, Yarka (IL); Talal Qeys, Upper Galilee (IL)

(73) Assignee: Iscar, Ltd., Tefen (IL)

( * ) Notice: Subject to any disclaimer, the term of this patent is extended or adjusted under 35 U.S.C. 154(b) by 121 days.

(21) Appl. No.: 15/189,415

(22) Filed: Jun. 22, 2016

(65) Prior Publication Data

US 2016/0303665 A1   Oct. 20, 2016

Related U.S. Application Data

(63) Continuation-in-part of application No. 14/580,821, filed on Dec. 23, 2014, now Pat. No. 9,636,758.

(51) Int. Cl.
*B23C 5/20* (2006.01)
*B23C 5/06* (2006.01)
*B23C 5/22* (2006.01)

(52) U.S. Cl.
CPC ............... *B23C 5/06* (2013.01); *B23C 5/202* (2013.01); *B23C 5/2213* (2013.01); *B23C 2200/0411* (2013.01); *B23C 2200/125* (2013.01); *B23C 2200/164* (2013.01); *B23C 2200/168* (2013.01); *B23C 2200/205* (2013.01);
(Continued)

(58) Field of Classification Search
CPC ........... Y10T 408/5586; Y10T 408/909; Y10T 408/90993; Y10T 407/1908; Y10T 407/191; Y10T 407/192; Y10T 407/1924; Y10T 407/1932; Y10T 407/1934; Y10T 407/1936; Y10T 407/1942; Y10T 407/227; Y10T 407/23; B23C 2200/0433; B23C 2200/361; B23C 2200/367; B23C 2200/41; B23C 2200/086; B23C 2200/164; B23C 2200/205; B23C 2200/208;
(Continued)

(56) References Cited

U.S. PATENT DOCUMENTS 3,670,380 A * 6/1972 Moore ................. B23B 27/164
                                                        407/113
5,586,843 A * 12/1996 Minicozzi ............... B23C 5/109
                                                        407/113
(Continued)

FOREIGN PATENT DOCUMENTS

| JP | 2007125669 A | * 5/2007 | ............... B23C 5/06 |
|----|---|---|---|
| JP | 2008 229745 | 10/2008 | |
| JP | 2010 094748 | 4/2010 | |

OTHER PUBLICATIONS

International Search Report dated Mar. 9, 2016, issued in PCT counterpart application No. PCT/IL2015/051162.
(Continued)

*Primary Examiner* — Sunil K Singh
*Assistant Examiner* — Nicole N Ramos
(74) *Attorney, Agent, or Firm* — Womble Bond Dickinson (US) LLP

(57) ABSTRACT

A high-feed milling tool assembly includes a tool and a ramping insert. The ramping insert includes ramping, feed and side sub-edges. The ramping and feed sub-edges are longer than the side sub-edges and converge with increasing proximity to the side sub-edge to which they are both connected.

17 Claims, 9 Drawing Sheets

(52) U.S. Cl.
CPC .. *B23C 2200/367* (2013.01); *B23C 2210/168* (2013.01); *B23C 2220/44* (2013.01); *Y10T 407/1924* (2015.01); *Y10T 407/1936* (2015.01)

(58) Field of Classification Search
CPC ........ B23C 2210/168; B23C 2210/086; B23C 5/06; B23C 5/22211; B23C 5/04; B23C 5/2213
See application file for complete search history.

(56) References Cited

U.S. PATENT DOCUMENTS

| | | | |
|---|---|---|---|
| 5,639,189 A * | 6/1997 | Hoefler | B23C 3/04 407/113 |
| 6,109,838 A | 8/2000 | Riviére | |
| 6,227,772 B1 * | 5/2001 | Heinloth | B23C 5/202 407/113 |
| 6,231,274 B1 | 5/2001 | Yoneyama et al. | |
| 6,238,146 B1 * | 5/2001 | Satran | B23B 27/1614 407/113 |
| 6,241,430 B1 | 6/2001 | Norström | |
| 6,270,292 B1 * | 8/2001 | Satran | B23C 5/2204 407/113 |
| 8,454,276 B2 * | 6/2013 | Uno | B23B 27/141 407/113 |
| 2004/0022590 A1 | 2/2004 | Satran et al. | |
| 2005/0023044 A1 * | 2/2005 | Schuffenhauer | B23C 5/207 175/426 |
| 2005/0111925 A1 | 5/2005 | Svenningsson et al. | |
| 2006/0104736 A1 | 5/2006 | Satran et al. | |
| 2007/0071561 A1 * | 3/2007 | Agic | B23B 27/16 407/34 |
| 2007/0104546 A1 | 5/2007 | Maeta et al. | |
| 2008/0003067 A1 * | 1/2008 | Ejderklint | B23C 5/06 407/40 |
| 2009/0136304 A1 * | 5/2009 | Satran | B23C 5/207 407/104 |
| 2011/0116877 A1 * | 5/2011 | Hodza | B23B 27/141 407/47 |
| 2012/0039678 A1 | 2/2012 | Nguyen et al. | |
| 2013/0129432 A1 | 5/2013 | Jaeger et al. | |
| 2013/0336735 A1 | 12/2013 | Nam et al. | |
| 2014/0294524 A1 | 10/2014 | Kumar et al. | |
| 2014/0369773 A1 * | 12/2014 | Waggle | B23C 5/003 407/54 |
| 2015/0117969 A1 | 4/2015 | Brunetto et al. | |
| 2015/0231711 A1 | 8/2015 | Matsubara et al. | |

OTHER PUBLICATIONS

International Search Report dated Oct. 27, 2017, issued in PCT counterpart application (No. PCT/IL2017/050630).
Written Opinion dated Oct. 27, 2017, issued in PCT counterpart application (No. PCT/IL2017/050630).

* cited by examiner

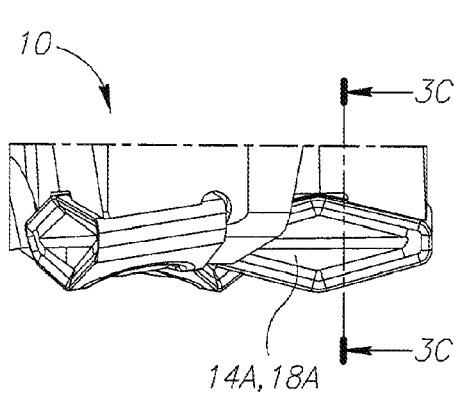
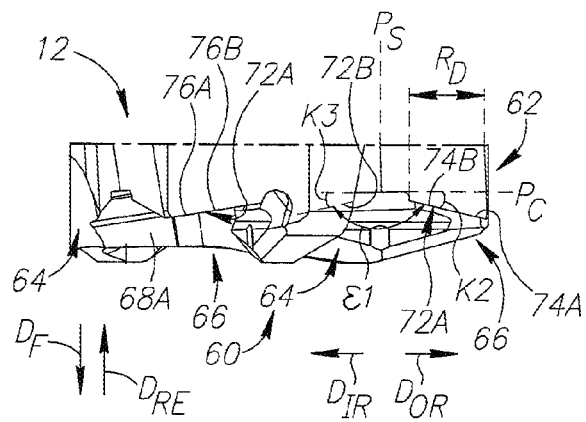
FIG.3A    FIG.3B
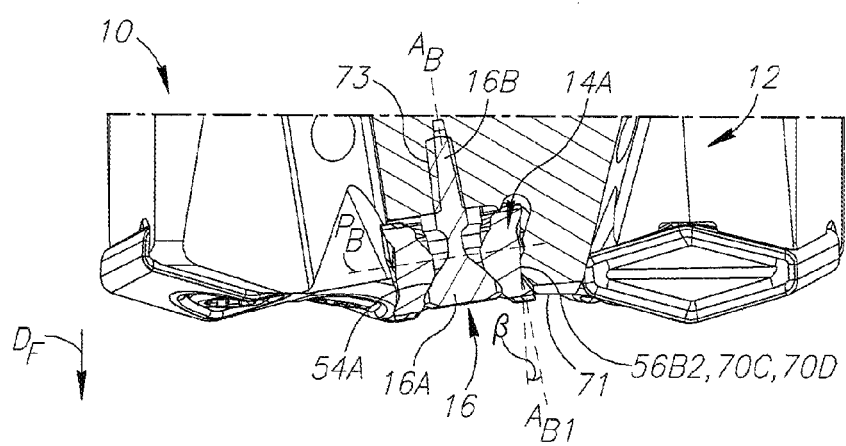
FIG.3C
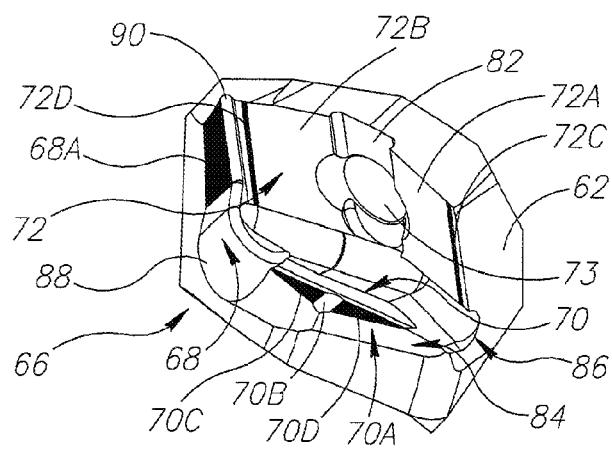
FIG.3D

RAMPING INSERT AND HIGH-FEED MILLING TOOL ASSEMBLY

RELATED APPLICATIONS

This is a Continuation-in-Part of U.S. patent application Ser. No. 14/580,821, filed Dec. 23, 2014, now U.S. Pat. No. 9,636,758. The contents of the aforementioned application are incorporated by references in their entirety.

FIELD OF THE INVENTION

The subject matter of the present application relates to high-feed milling tool assemblies comprising tools and inserts for ramping and high-feed metal machining operations. More particularly, the subject matter is directed to ramping inserts configured to be indexed to exactly four operative positions on a tool (two indexable positions per rake surface).

BACKGROUND OF THE INVENTION

High-feed milling assemblies are typically characterized with a construction designed to carry out shouldering operations within a chip load range of 0.5 mm to 2 mm. A combination of moderate chip load and primarily axially directed forces can allow such assemblies to achieve a relatively high tool feed rate.

For example, US 2005/0111925A1 discloses a high-feed milling tool. Of note is the approach angle (K') shown in FIG. 9 and related explanation how a moderate cutting depth is compensated for by an increased (i.e. high-feed) tool feed rate (FIG. 11, par. [0051]). A ramping operation is explained with reference to FIGS. 13 and 14 in par. [0056]. Additionally, the inserts are stated to be indexable to four different positions (par. [0058]). It will also be noted that the insert disclosed has a significantly non-parallel peripheral surface extending from the top side 15 to the bottom side 16 to provide desired clearance. A further feature disclosed is the provision of a chamfer surface 35 for clearance (FIG. 5, par. [0047]).

W0 2014/156225 discloses another milling tool and cutting insert of interest. As will be best understood from at least FIG. 16 thereof, however, the cutting insert and insert pocket shown differs significantly from that described hereinbelow.

US 2013/0129432 discloses cutting inserts for being mounted in cutter bodies for face milling and ramping. The author thereof is of the opinion that it is not possible to obtain unique axial and radial position of a standard negative square cutting insert that allows alternating high-feed face milling and ramping with relief of the insert without changing the position of the cutting inserts in the cutter body, but notes that this is not the case with positive inserts with natural relief (par. [0006]). Also, the inserts disclosed are configured to be indexable to multiple different positions.

SUMMARY OF THE INVENTION

Generally speaking, cutting inserts which can be indexed to a greater number of positions are more cost effective than cutting inserts configured to be indexed to a lower number of positions. Nonetheless, it is believed that a ramping insert in accordance with the subject matter of the present application which is only configured for four indexable positions and necessitates an arguably complex tool to provide necessary clearance, but can be comparatively simply manufactured and is still capable of performing ramping and high-feed operations, can be competitive with cutting inserts having a larger number of indexable positions or tools having a simpler design.

In accordance with a first aspect of the subject matter of the present application, there is provided a ramping insert comprising: opposing first and second rake surfaces; an insert peripheral surface connecting the first and second rake surfaces; an insert screw hole opening out to opposing sides of the insert peripheral surface, the insert screw hole having an insert screw hole axis; and first and second cutting edges extending along an intersection of the insert peripheral surface and a corresponding one of the first and second rake surfaces; each of the first and second cutting edges comprising: a first ramping sub-edge; a first side sub-edge; a first feed sub-edge connected to the first ramping sub-edge and the first side sub-edge; a second ramping sub-edge connected to the first side sub-edge; a second side sub-edge connected to the first ramping sub-edge; and a second feed sub-edge connected to the second ramping sub-edge and the second side sub-edge; wherein: each of the ramping and feed sub-edges is longer than each of the side sub-edges; a maximum rake surface length of each rake surface is measurable between the first and second side sub-edges thereof, and each of the ramping and feed sub-edges converge with increasing proximity to the side sub-edge to which they are both connected.

In accordance with another aspect of the subject matter of the present application, there is provided a ramping insert comprising ramping and feed sub-edges converging with increasing proximity to the side sub-edge to which they are both connected.

In accordance with still another aspect of the subject matter of the present application, there is provided a ramping insert comprising, at each of two opposing rake surfaces thereof, two ramping sub-edges, two feed sub-edges, and two side sub-edges; each of the ramping and feed sub-edges being longer than each side sub-edge.

In accordance with yet another aspect of the subject matter of the present application, there is provided a ramping insert comprising: opposing first and second rake surfaces; an insert peripheral surface; first and second cutting edges extending along an intersection of the insert peripheral surface and a corresponding one of the first and second rake surfaces; and an insert screw hole opening out to opposing sides of the insert peripheral surface; the insert peripheral surface comprising a first ramping sub-surface; a first side sub-surface; a first feed sub-surface connected to the first ramping sub-surface and first side sub-surface; a second ramping sub-surface connected to the first side sub-surface; a second side sub-surface connected to the first ramping sub-surface; and a second feed sub-surface connected to the second ramping sub-surface and second side sub-surface.

In accordance with another aspect of the subject matter of the present application, there is provided a ramping insert comprising a ramping sub-edge and a feed sub-edge; wherein the ramping sub-edge comprises a sharp ramping corner portion at an end thereof proximate to the feed sub-edge; and the feed sub-edge comprises a sharp feed corner portion at an end thereof proximate to the feed sub-edge.

Stated differently, according to any of the aspects, the ramping and feed sub-edges of a ramping insert can be connected via two adjacent sharp corner portions.

In accordance with a further aspect, there is provided a high-feed milling tool configured for rotating about a rotation axis in a rotation direction, the rotation axis defining forward and rearward directions, the tool comprising an insert pocket; the insert pocket comprising a pocket top surface which in turn comprises first and second pocket top sub-surfaces; the first pocket top sub-surface being adjacent to a tool peripheral surface and extending more in a forward direction with increasing proximity thereto; the second pocket top sub-surface being adjacent to a pocket side surface and extending more in the forward direction with increasing proximity thereto.

In accordance with another aspect, there is provided a high-feed milling tool configured for rotating about a rotation axis in a rotation direction, the rotation axis defining forward and rearward directions, the tool comprising: a tool end surface and a circumferentially extending tool peripheral surface extending rearward therefrom; a flute formed at an intersection of the tool end surface and the tool peripheral surface and extending rearward therefrom; and an insert pocket formed at an intersection of the tool end surface and the tool peripheral surface and opening out to the flute, the insert pocket comprising: a pocket back surface extending inwardly from the tool peripheral surface and facing the rotation direction; a pocket side surface extending from the pocket back surface to the flute and facing outwardly; a pocket top surface extending inwardly from the tool peripheral surface to the pocket side surface, and also extending from the pocket back surface to the flute; and a pocket screw hole opening out to the pocket top surface; wherein: the pocket back surface comprises a back abutment sub-surface; the pocket top surface comprises first and second pocket top sub-surfaces; the first pocket top sub-surface is adjacent to the tool peripheral surface and extends more in the forward direction with increasing proximity thereto; the second pocket top sub-surface is adjacent to the pocket side surface and extends more in the forward direction with increasing proximity thereto; and the first and second pocket top sub-surfaces extend more in the forward direction with increasing proximity to the flute.

In accordance with still another aspect, there is provided a high-feed milling tool assembly comprising, in combination: a ramping insert which can be according to the first aspect; a tool which can be according to the previous aspect; and a screw fastening the ramping insert to the insert pocket of the tool via the insert and pocket screw holes; the tool and ramping insert being configured for abutment of: the insert peripheral surface with each of the pocket side surface and first and second pocket top sub-surfaces; and one of the first and second rake surfaces with the pocket back surface.

In accordance with another aspect, there is provided a high-feed milling tool assembly comprising, in combination a tool according to one of the tool aspects described above and a cutting insert according to one of the cutting insert aspects described above.

It will be understood that the above-said is a summary, and that any of the aspects above may further comprise any of the features described hereinbelow. Specifically, the following features, either alone or in combination, may be applicable to any of the above aspects:

A. An insert can comprise first and second cutting edges which extend along an intersection of an insert peripheral surface and a corresponding one of first and second rake surfaces.

B. First and second cutting edges can extend further than first and second rake surfaces from a median height plane. Feed sub-edges, at least at a connection point with side sub-edges, can extend further than ramping sub-edges, at least at a connection point of the ramping sub-edges with side sub-edges, from the median height plane. Each feed sub-edge can lie in a single plane perpendicular to a median height plane. Each ramping sub-edge can be slanted such that with increasing proximity to a connection point with a side sub-edge, it extends closer to a median height plane. Such slant can assist in strengthening the side sub-edge by reducing a relatively high rake angle that would otherwise form there, thereby improving machining capability of the side sub-edge.

C. First and second cutting edges can each have a negative land angle a (i.e. slanted in an inward-downward direction from the respective cutting edge to an associated rake surface of the insert). Negative lands are believed to be beneficial for at least high-feed shouldering operations.

D. An insert can comprise opposing first and second rake surfaces.

E. Each rake surface can comprise a rake abutment surface. Each rake abutment surface can comprise first and second rake abutment sub-surfaces respectively located on opposing sides of a median length plane. Each rake abutment sub-surface can be slanted such that with increasing proximity to the median length plane there is greater extension from a median height plane.

F. Rake surfaces of an insert can be identical.

G. First and second rake surfaces can be devoid of projecting portions. Particularly, projecting portions which may impede chip flow. The first and second rake surfaces can each comprise a central rake surface region which can be planar.

H. An insert can comprise an insert peripheral surface. The insert peripheral surface can connect first and second rake surfaces of the insert.

I. An insert peripheral surface can comprise: a first ramping sub-surface; a first side sub-surface; a first feed sub-surface connected to the first ramping sub-surface and first side sub-surface; a second ramping sub-surface connected to the first side sub-surface; a second side sub-surface connected to the first ramping sub-surface; and a second feed sub-surface connected to the second ramping sub-surface and second side sub-surface.

J. An insert peripheral surface can extend parallel from a first cutting edge to a second cutting edge. By being devoid of slanted clearance surfaces (e.g., such as clearance surface "22" disclosed in US 2005/0111925A1), providing clearance for an insert can result in a more complex tool design. Nonetheless, it is believed that such design can result in a simpler insert manufacturing process, e.g. an insert may be able to be pressed to final dimensions, which is believed to offset known disadvantages.

K. An insert peripheral surface can be devoid of relief portions. By not having relief portions (e.g., such as chamfer surface "35" disclosed in US 2005/0111925A1), providing clearance for an insert can result in a more complex tool design. Nonetheless, it is believed that such design can result in a simpler insert manufacturing process, e.g. an insert may be able to be pressed to final dimensions, which is believed to offset known disadvantages.

L. An insert can comprise an insert screw hole opening out to opposing sides of an insert peripheral surface. The insert screw hole can, at each side of the insert peripheral surface, open out to sub-surfaces of the insert peripheral surface which are slanted relative to each other. The insert screw hole can, at each side of the insert peripheral surface, open out to both ramping and feed sub-surfaces. The insert screw hole can open out to first ramping and feed sub-surfaces as well as second ramping and feed sub-surfaces. The insert screw hole can be equally spaced from side sub-surfaces. The insert screw hole can be equally spaced from rake surfaces. The insert screw hole can have an insert screw hole axis. The insert screw hole axis can lie along a median thickness plane and can be perpendicular to a median length plane. A screw hole thickness can increase with increasing proximity to each of first and second rake surfaces.

M. Each cutting edge can comprise: a first ramping sub-edge; a first side sub-edge; a first feed sub-edge connected to the first ramping sub-edge and first side sub-edge; a second ramping sub-edge connected to the first side sub-edge; a second side sub-edge connected to the first ramping sub-edge; and a second feed sub-edge connected to the second ramping sub-edge and second side sub-edge.

N. Each ramping sub-edge can be longer than each side sub-edge. Even though it is logical that ramping sub-edges be smaller than other sub-edges of an insert, since the ramping operation occurs over only a small percentage of overall machining time, certainly compared to a primary shouldering operation, it has been found that providing a comparatively long ramping sub-edge can overcome some clearance difficulties which complicate insert manufacture.

O. Each feed sub-edge can be longer than each side sub-edge. This can increase efficiency of a primary milling operation, i.e. shouldering, which utilizes the feed sub-edge.

Each feed sub-edge can be longer than each ramping sub-edge. This can increase efficiency of a primary milling operation, i.e. shouldering, which utilizes the feed sub-edge. A straight portion of a ramping sub-edge can have a length of $70\%\pm15\%$ of the length of a straight portion of an adjacent feed sub-edge.

P. Each of ramping and feed sub-edges can converge with increasing proximity to a side sub-edge to which they are both connected.

Q. Each ramping sub-edge of a rake surface can form an internal acute insert ramping angle k0 with a median length plane. The insert ramping angle k0 can fulfill the condition ($5°\leq k0\leq 30°$). The insert ramping angle k0 preferably fulfills the condition ($15°\pm5°$). A sub-surface of an insert peripheral surface which is adjacent to the ramping sub-edge can be oriented at the same angle as the ramping sub-edge.

R. Each feed sub-edge of a rake surface can form an internal acute insert approach angle k1 with a median length plane. The insert approach angle k1 can fulfill the condition ($5°\leq k1\leq 30°$). The insert approach angle k1 preferably fulfills the condition ($15°\pm5°$). A sub-surface of the insert peripheral surface which is adjacent to the feed sub-edge can be oriented at the same angle as the feed sub-edge.

S. An insert ramping angle k0 and an insert approach angle k1 can be equal. However, in certain circumstances, e.g. for inserts configured for relatively smaller diameter tools, the insert approach angle k1 can be greater than the insert ramping angle k0. This can allow an acceptable depth (and hence feed rate) to be achieved even though the ramping function efficiency is lessened.

T. Each side sub-edge can be bisected by a median length plane.

U. Each side sub-edge can comprise a straight portion. Unless stated otherwise, the words "straight portion" in connection with any sub-edge refers to a view facing a rake surface (such as that shown in FIG. 2C). It is believed that a side sub-edge with a straight portion can provide a significantly longer machining tool life than a curved side sub-edge. Such straight portion can be between $45\pm20\%$ of an overall side sub-edge length. Generally speaking, the word "overall" used in connection a sub-edge length includes corner portions on both sides of the sub-edge (until a connection point with an adjacent sub-edge) and a remainder of the sub-edge therebetween.

V. Straight portions of side sub-edges on the same rake surface can be parallel to each other. Straight portions of the side sub-edges on a first and second rake surface can be parallel to each other. The straight portions of the side sub-edges on the first and second rake surfaces can be parallel to the straight portions on only the same rake surface.

W. A sub-surface of an insert peripheral surface which is adjacent to a side sub-edge can be oriented at the same angle as the side sub-edge. The side sub-edge straight portions can have a length which is $15\%\pm5\%$ of a maximum thickness of the insert measurable parallel to a median thickness plane. The side sub-edge straight portions can have a length which is $13\%\pm5\%$ of an overall length of a ramping sub-edge. The side sub-edge straight portions can have a length which is $13\%\pm5\%$ of an overall length of a feed sub-edge. The side sub-edge straight portions can have a length which is $15\%\pm5\%$ of a length of a straight portion of a ramping sub-edge. The side sub-edge straight portions can have a length which is $15\%\pm5\%$ of a length of a straight portion of a feed sub-edge.

X. Each side sub-edge can comprise a corner portion at each end thereof.

Y. Each ramping sub-edge can comprise a straight portion. Straight portions of ramping sub-edges on the same rake surface can be parallel to each other. Straight portions of all ramping sub-edges of an insert can be parallel to each other. A straight portion can be $85\%\pm5\%$ of an overall ramping sub-edge length.

Z. Each ramping sub-edge can comprise a corner portion at each end thereof.

AA. Each feed sub-edge can comprise a straight portion. Straight portions of feed sub-edges on the same rake surface can be parallel to each other. Straight portions of all feed sub-edges of an insert can be parallel to each other. A straight portion can be $85\%\pm5\%$ of an overall feed sub-edge length.

BB. Each feed sub-edge can comprise a corner portion at each end thereof.

CC. Straight portions of ramping and feed sub-edges can have a same length.

DD. A corner portion of a sub-edge can preferably be curved. Even though curved corners can be less precise than sharp or chamfered corners, such curvature can allow a simplified manufacturing process.

EE. A connection point between adjacent edges can be located at the middle of a corner formed by adjacent corner portions of adjacent edges. For example, each ramping sub-edge can comprise a corner portion and each feed sub-edge can comprise a corner portion adjacent to the ramping sub-edge's corner portion, and a connection point of the ramping sub-edge to the feed sub-edge is located at the middle of a corner formed by the adjacent corner portions. Stated generally, ramping and feed sub-edges can be connected at a connection point located at the middle of a corner formed by adjacent corner portions. Similarly, ramping and side sub-edges can be connected at a connection point located at the middle of a corner formed by adjacent corner portions. Similarly, feed and side sub-edges can be connected at a connection point located at the middle of a corner formed by adjacent corner portions.

FF. Connection points of adjacent ramping and feed sub-edges can all lie on a median thickness plane. Connection points of adjacent ramping and feed sub-edges can be located on different sides of a median thickness plane.

GG. Connection points of adjacent ramping and feed sub-edges can all lie on a plane parallel to a median thickness plane.

HH. A maximum thickness of an insert can be between connection points of adjacent ramping and feed sub-edges.

II. A maximum rake surface length on each rake surface can be measurable between first and second side sub-edges thereof. A length measurable parallel to a median length plane and between first and second side sub-edges can be greater than all other lengths measurable between other sub-edges and along a rake surface.

JJ. A longitudinal rake surface length $L_{LR}$ on each rake surface can be measurable parallel to a median length plane. The longitudinal rake surface length $L_{LR}$ can be greater than a maximum thickness $T_M$ measurable perpendicular to the median length plane. Preferably, the longitudinal rake surface length $L_{LR}$ fulfills the condition $(2.3 T_M \pm 0.5 T_M)$.

KK. A longitudinal rake surface length $L_{LR}$ on each rake surface can be greater than a maximum height $H_M$ measurable parallel to a height plane. Preferably, the maximum length fulfills the condition $(1.5 H_M \pm 0.3 H_M)$.

LL. An insert can have a maximum height which is measurable parallel to a rake axis.

MM. An insert can have a maximum thickness which is measurable parallel to a median thickness plane.

NN. An insert's maximum height can be greater than a maximum thickness thereof.

OO. An insert can be 180° rotationally symmetric about a rake axis extending through a center of first and second rake surfaces and/or 180° rotationally symmetric about a height axis perpendicular to the rake axis and extending along an intersection of median thickness and height planes.

PP. Each ramping sub-edge can comprise a sharp ramp corner portion, said sharp ramp corner portion being a corner portion of the ramping sub-edge closest to a feed sub-edge.

QQ. Each feed sub-edge can comprise a sharp feed corner portion adjacent to a sharp ramp corner portion.

RR. A straight extension can be defined between discontinuity points of sharp ramp and feed corner portions. The straight extension can have a length between 0.5 mm to 2.0 mm. Preferably, the straight extension can have a length less than 0.75 mm. The straight extension can have a length smaller than a quarter of the length of a straight portion of a feed sub-edge. Preferably, the straight extension has a length smaller than or equal to a sixth of the length of the straight portion of the feed sub-edge.

SS. First and second cutting edges can each lie in a plane. It will be understood that this means that each of the first and second cutting edges lie in different planes. Although the different planes can preferably be parallel to each other.

TT. A tool can be configured for rotating about a rotation axis in a rotation direction, the rotation axis defining forward and rearward directions.

UU. A tool can comprise a tool end surface and a circumferentially extending tool peripheral surface extending rearward therefrom.

VV. A flute can be formed at intersection of a tool end surface and a tool peripheral surface and can extend rearward therefrom.

WW. An insert pocket can be formed at an intersection of a tool end surface and a tool peripheral surface. The insert pocket can open out to a flute.

XX. An insert pocket can comprise a pocket side surface. The pocket side surface can extend from a pocket back surface to a flute. The pocket side surface can extend from a pocket top surface to a flute. The pocket side surface can face outwardly.

YY. A pocket side surface can comprise a side abutment sub-surface. The side abutment surface can extend perpendicular to a tool plane extending perpendicular to a rotation axis.

ZZ. An insert pocket can comprise a pocket back surface. The pocket back surface can extend inward from a tool peripheral surface. The pocket back surface can face a rotation direction.

AAA. A pocket back surface can comprise a back abutment surface. A back abutment surface can be formed with a back surface relief recess dividing the back abutment surface into two back abutment sub-surfaces. While such division can reduce contact area with a cutting insert, it can accommodate a less precisely manufactured insert and hence can simplify insert manufacture. The back abutment surface can be axially located along at a lower half of an insert pocket (i.e. a half of the insert pocket closest to a tool end surface).

BBB. A back abutment surface or sub-surface can be slanted relative to a pocket screw hole axis, such that with increasing proximity to the tool end surface the back abutment sub-surface extends further in the rotation direction.

CCC. An insert pocket can comprise a pocket top surface. The pocket top surface can extend inwardly from a tool peripheral surface to a pocket side surface. The pocket top surface can extend from a pocket back surface to a flute.

DDD. A pocket top surface can comprise first and second pocket top sub-surfaces.

EEE. A first pocket top sub-surface can be adjacent to a tool peripheral surface and can extend more in a forward direction with increasing proximity to the tool peripheral surface.

FFF. A second pocket top sub-surface can be adjacent to a pocket side surface and can extend more in a forward direction with increasing proximity to the pocket side surface.

GGG. Both first and second pocket top sub-surfaces can extend more in a forward direction with increasing proximity to a flute. While such extension is less desirable for machining, it is believed to be offset by the possibility to manufacture a simpler insert.

HHH. An insert pocket can comprise a pocket screw hole. The pocket screw hole can open out to a pocket top surface.

III. An assembly can comprise a tool, ramping insert and screw configured to fasten the insert to an insert pocket of the tool.

JJJ. An assembly can comprise multiple ramping inserts.

KKK. A tool and ramping insert can be configured for abutment of the ramping insert's insert peripheral surface with the tool's pocket side surface and first and second pocket top sub-surfaces, and abutment of one of the ramping insert's first and second rake surfaces with the tool's pocket back surface. The ramping insert can be configured so that it can be indexed so that a different portion of the insert peripheral surface abuts the tool's pocket side surface and first and second pocket top sub-surfaces. Additionally, the ramping insert can be configured so that it can be reversed so that the other rake surface contacts the tool's pocket back surface (and also indexed in the reversed position). The tool and/or ramping insert can be configured for fastening the ramping insert to an insert pocket in exactly four different positions.

LLL. In a view of a tool's pocket back surface in a direction opposite to the rotation direction, a first pocket top sub-surface can form an internal acute first tool angle k2 with a tool plane extending perpendicular to the rotation axis and a second pocket top sub-surface can form an internal acute second tool angle k3 with the tool plane. The first and second tool angles can fulfill the condition ($6° \leq k2, k3 \leq 31°$). It is believed better performance can be achieved with approach angles closer to 15.5°. Accordingly, the first and second tool angles preferably fulfill the condition ($15.5° \pm 5°$).

MMM. First and second tool angles k2, k3 can be equal.

NNN. First and second pocket top sub-surfaces can extend an equal radial distance. The term "radial" is used in a general sense only and, as will be understood from the drawings, refers to general inward-outward directions of a tool (in a plane perpendicular to a rotation axis thereof) and not necessarily a direction directed exactly to the rotation axis.

OOO. A pocket top surface can be formed with a top surface relief recess between first and second pocket top sub-surfaces. While having a top surface relief recess between first and second pocket top sub-surfaces can reduce contact area with a cutting insert, it can accommodate a less precisely manufactured insert and hence can simplify insert manufacture.

PPP. A tool can comprise a number (n) of insert pockets. The insert pockets can be equally circumferentially spaced along a tool peripheral surface. The insert pockets can be identical. The number (n) of insert pockets of the tool can be equal to a closest integer resulting from dividing the tool's cutting diameter, measured in millimeters, by 10.

QQQ. A sum of first and second tool approach angles k2, k3 can be greater than a sum of insert ramping and approach angles k0, k1. It is believed that even though this reduces a contact area between the insert and the tool, such disadvantage is offset by allowing a simpler insert manufacturing process.

RRR. A tool assembly can preferably be configured for a depth of cut $a_p$ fulfilling the condition ($1 \text{ mm} \leq a_p \leq 2.5 \text{ mm}$). It is believed better performance can be achieved with a depth of cut $a_p$ closer to 1.85 mm. Accordingly, the depth of cut $a_p$ preferably fulfills the condition ($1.85 \text{ mm} \pm 0.5 \text{ mm}$). A preferred ratio of $a_p$ to length fulfills the condition (1:15 to 1:6).

In the specification hereinabove and below, a value followed by a range using the symbol "±", is to be considered to be an optimal value and values of the range closer to the optimal value are more preferred than values further therefrom.

It will be understood that all inserts mentioned in the specification and claims are ramping inserts, and that the word "insert" is occasionally mentioned without the preceding word "ramping" for conciseness only. Similarly, the words "high-feed milling tool" may appear in the abbreviated form of the word "tool" only.

BRIEF DESCRIPTION OF THE DRAWINGS

For a better understanding of the subject matter of the present application, and to show how the same may be carried out in practice, reference will now be made to the accompanying drawings, in which:

FIG. 3A is a view showing a portion of the assembly in FIG. 1C;

FIG. 3B is a view corresponding the view in FIG. 3A, but showing the tool only;

FIG. 3C is a sectional view taken along line 3C-3C in FIG. 3A;

FIG. 3D is a perspective view of an insert pocket of the tool shown in FIG. 3B;

DETAILED DESCRIPTION

Figure 1A:
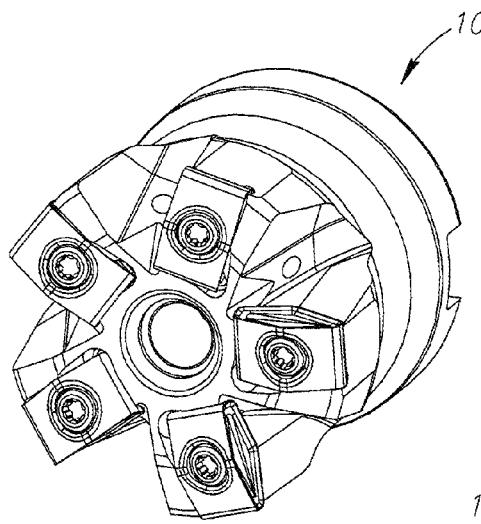
FIG. 1A is a perspective view of a tool assembly.

Reference is made to FIGS. 1A to 1D which illustrate a high-feed milling tool assembly 10. The assembly 10 can comprise a tool 12 and a ramping insert 14 (14A, 14B, 14C, 14D, 14E), and a screw 16 for fastening each insert 14 to the tool 12.

For a tool diameter $D_T$ of 50 mm, the tool 12 and can have five inserts 14 as shown.

A rotation axis $A_R$ can extend longitudinally through the center of the tool 12, and can define a forward direction $D_F$ and a rearward direction $D_{RE}$.

The tool 12 can be configured for rotating about the rotation axis $A_R$ in a rotation direction $D_{RO}$.

Figure 1B:
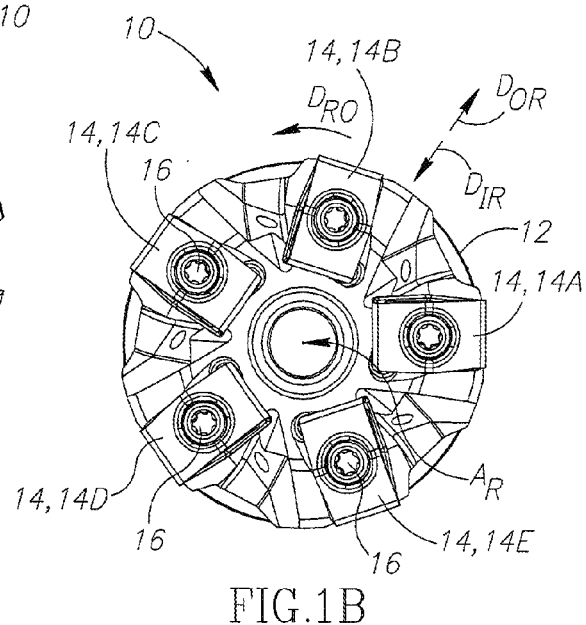
FIG. 1B is an end view of the assembly in FIG. 1A.
Figure 1C:
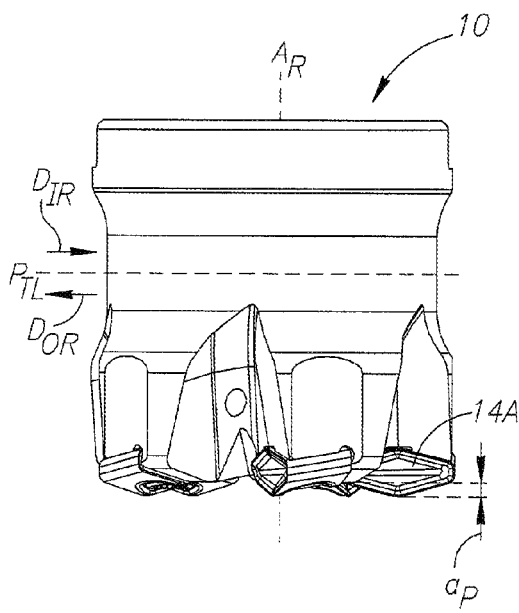
FIG. 1C is side view of the assembly in FIGS. 1A and 1B, and is perpendicular to a rake surface of the ramping insert in the right corner of the figure (i.e., a view along a rake axis of that insert)
Figure 1D:
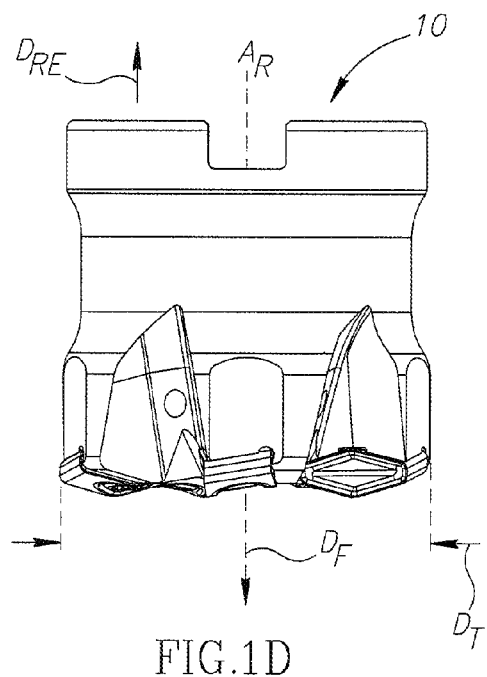
FIG. 1D is side view of the assembly in FIGS. 1A to 1C, and is rotated from the view in FIG. 1C to be perpendicular to a side sub-surface of the ramping insert in the middle of the figure.

FIG. 1C shows a tool plane $P_{TL}$ extending perpendicular to the rotation axis $A_R$. An outward direction $D_{OR}$ extends parallel to the tool plane $P_{TL}$ and outward from the tool 12. An inward direction $D_{IR}$ extends parallel to the tool plane $P_{TL}$ and inward into the tool 12. It will be understood that the inward and outward directions are not precisely directed towards the rotation axis $A_R$, but are generally directed towards and away from the center of the tool 12.

Referring now to FIGS. 2A to 2E, the insert 14A will be described in more detail. The inserts shown can be identical and can be considered to have all features mentioned hereinbelow in connection with the insert 14A described.

The insert 14A is for metal machining operations and can be typically made of extremely hard and wear-resistant material such as cemented carbide. Preferably, the insert 14A can be pressed to final dimensions.

The insert 14A can comprise opposing first and second rake surfaces 18A, 18B and an insert peripheral surface 20 connecting the first and second rake surfaces 18A, 18B.

The insert 14A can be formed with an insert screw hole 22 opening out to opposing sides 24A, 24B (FIG. 2E) of the insert peripheral surface 20.

A first cutting edge 26A can extend along an intersection of the insert peripheral surface 20 and the first rake surface 18A.

A second cutting edge 26B can extend along an intersection of the insert peripheral surface 20 and the second rake surface 18B.

The first and second cutting edges 26A, 26B can be identical and can be considered to have all features mentioned hereinbelow in connection with the other.

Also, the first and second rake surfaces 18A, 18B can be identical and can be considered to have all features mentioned herein below with the other.

The first cutting edge 26A can comprise a first ramping sub-edge 28A1; a first side sub-edge 28B1; a first feed sub-edge 28C1 connected to the first ramping sub-edge 28A1 and first side sub-edge 28B1; a second ramping sub-edge 28A2 connected to the first side sub-edge 28B1; a second side sub-edge 28B2 connected to the first ramping sub-edge 28A1; and a second feed sub-edge 28C2 connected to the second ramping sub-edge 28A2 and second side sub-edge 28B2.

The first rake surface 18A can comprise a land 30 extending inwardly from the first cutting edge 26A.

Further inward of the land 30 can be a sloping portion 32 that extends between the land 30 and a central rake surface region 34.

Figure 2A:
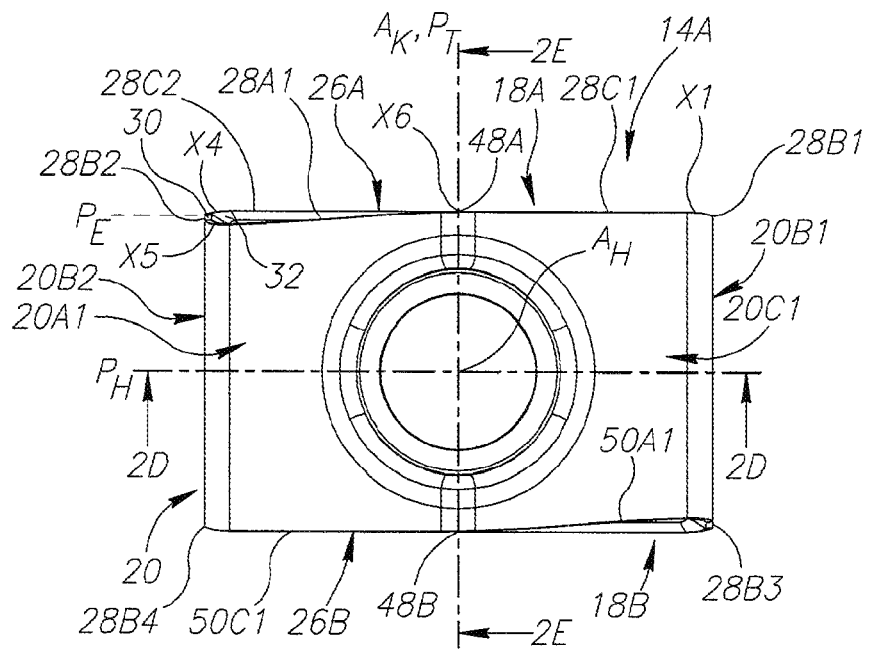
FIG. 2A is a top view of a ramping insert of the face mill in FIGS. 1A to 1D.
Figure 2B:
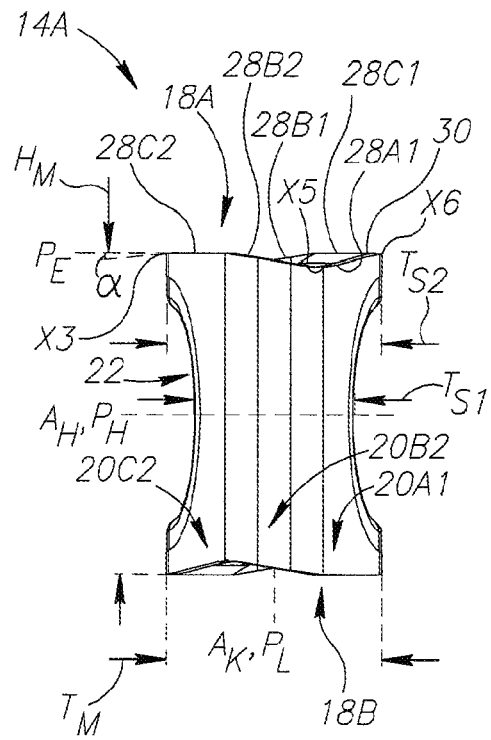
FIG. 2B is a side view of the ramping insert in FIG. 2A.
Figure 2C:
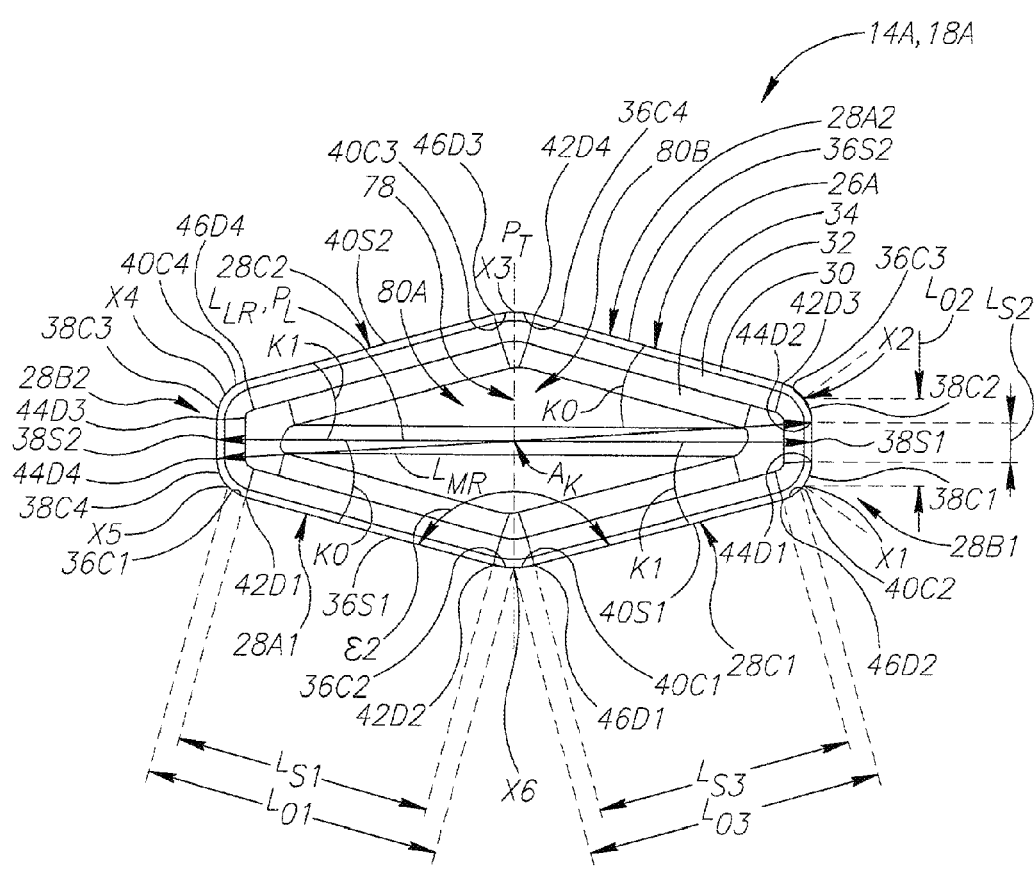
FIG. 2C is front view of the ramping insert in FIGS. 2A and 2B, this figure can also be considered as a view perpendicular to a rake surface (i.e. a view along a rake axis)

As shown best in FIG. 2C, the ramping and feed sub-edges converge with increasing proximity to the side sub-edge to which they are both connected. For example, the first feed sub-edge 28C1 is closer to the second ramping sub-edge 28A2 with increasing proximity to the first side sub-edge 28B1.

Figure 2D:
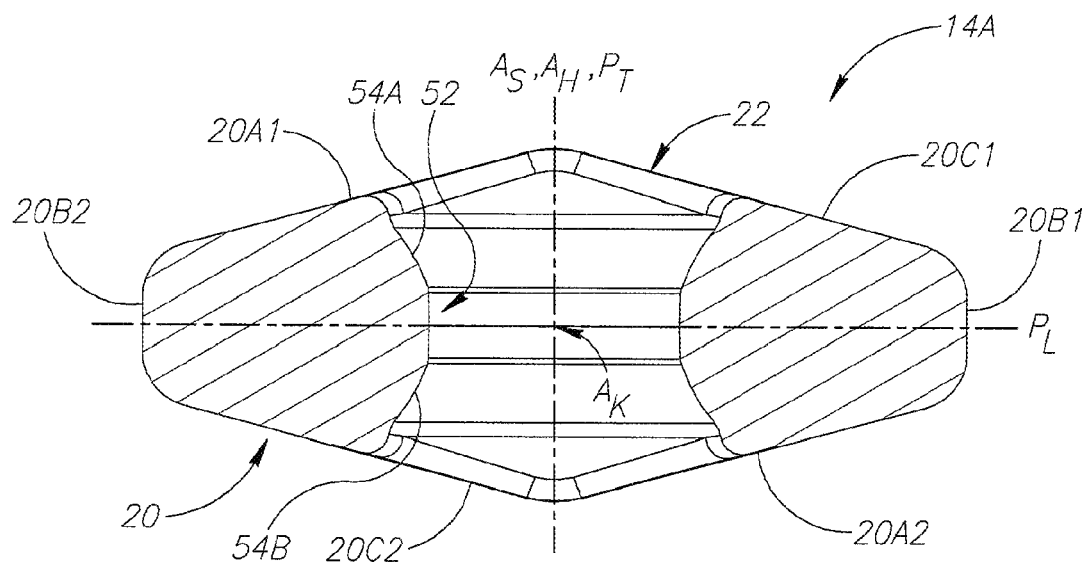
FIG. 2D is a sectional view taken along line 2D-2D in FIG. 2A.

Referring to FIG. 2D, the insert 14A can comprise a rake axis $A_K$ extending through a center of, and perpendicular to, the first and second rake surfaces 18A, 18B (FIG. 2A).

A median length plane $P_L$ can bisect the first and second rake surfaces 18A, 18B along a longitudinal dimension thereof. The median length plane $P_L$ can bisect the side sub-edges 28B1, 28B2, 28B3, 28B4 (FIGS. 2A, 2C).

A median thickness plane $P_T$ can extend perpendicular to the median length plane $P_L$ and can also bisect the first and second rake surfaces 18A, 18B.

Referring to FIG. 2A, a median height plane $P_H$ can extend perpendicular to the median length and thickness planes $P_L$, $P_T$ and can also bisect the insert 14A.

A height axis $A_H$ can extend perpendicular to the rake axis $A_K$ and can extend along an intersection of the median thickness and height planes $P_T$, $P_H$.

As the insert screw hole can be in the center of the insert 14A, an insert screw hole axis $A_S$ can be coaxial with the height axis $A_H$.

The insert 14A can be configured for two indexable positions. For example, the insert 14A can be 180° rotationally symmetric about the rake axis $A_K$.

The insert 14A can be configured to be reversed, allowing two additional indexable positions. For example, the insert 14A can also be 180° rotationally symmetric about the height axis $A_H$.

Referring to FIG. 2C, each ramping sub-edge 28A1, 28A2 can comprise a straight portion 36S1, 36S2. Each ramping sub-edge 28A1, 28A2 can comprise a pair of corner portions 36C1, 36C2, 36C3, 36C4 connected to each side of the straight portions 36S1, 36S2.

Each side sub-edge 28B1, 28B2 can comprise a straight portion 38S1, 38S2. Each side sub-edge 28B1, 28B2 can comprise a pair of corner portions 38C1, 38C2, 38C3, 38C4 connected to each side of the straight portions 38S1, 38S2.

Each feed sub-edge 28C1, 28C2 can comprise a straight portion 40S1, 40S2. Each ramping sub-edge 28C1, 28C2 can comprise a pair of corner portions 40C1, 40C2, 40C3, 40C4 connected to each side of the straight portions 40S1, 40S2.

Each straight portion (36S1, 36S2, 38S1, 38S2, 40S1, 40S2) ends at discontinuity points (42D1, 42D2, 42D3, 42D4, 44D1, 44D2, 44D3, 44D4, 46D1, 46D2, 46D3, 46D4), i.e. where the edge transitions to extend in a different direction. Should the straight portions be generally straight but be slightly arched (at least relative to a theoretical straight line, but still significantly less arched than the corner portions) the discontinuity points are to be considered to start where there is a visible change in direction or gradient.

The straight portion 36S1 of the first ramping sub-edge 28A1 can have a length $L_{S1}$.

The straight portion 38S1 of the first side sub-edge 28B1 can have a length $L_{S2}$.

The straight portion 40S1 of the first feed sub-edge 28C1 can have a length $L_{S3}$.

Each sub-edge can transition to an adjacent sub-edge at a connection point bisecting a corner formed by adjacent corner portions. For example, the first feed sub-edge 28C1 and first side sub-edge 28B1 can connect at a first connection point X1. The first connection point X1 can be an equal distance from the start of the straight portions 40S1, 38S1 of the first feed sub-edge 28C1 and first side sub-edge 28B1. Similarly, the first side sub-edge 28B1 and second ramping sub-edge 28A2 can connect at a second connection point X2. The second ramping sub-edge 28A2 and the second feed sub-edge 28C2 can connect at a third connection point X3. The second feed sub-edge 28C2 and the second side sub-edge 28B2 can connect at a fourth connection point X4. The second side sub-edge 28B2 and the first ramping sub-edge 28A1 can connect at a fifth connection point X5. The first ramping sub-edge 28A1 and the first feed sub-edge 28C1 can connect at a sixth connection point X6.

An overall length of each sub-edge can be measured between the connection points thereof. For example, an overall length $L_{O1}$ of the first ramping sub-edge 28A1 can be measured between the connection points X5, X6 thereof. An overall length $L_{O2}$ of the first side sub-edge can be measured between the connection points X1, X2 thereof. An overall length $L_{O3}$ of the first feed sub-edge can be measured between the connection points X6, X1 thereof.

The straight portion of the first ramping and feed sub-edges $36_{S1}$, $40_{S1}$ can have the same length $L_{S1}$, $L_{S3}$. The ramping and feed sub-edges overall lengths $L_{O1}$, $L_{O3}$ can also be the same length.

The lengths of the second sub-edges 28A2, 28B2, 28C2 can be the same as those of the respective first sub-edge 28A1, 28B1, 28C1.

The straight portions of the first and second ramping sub-edges 28A1, 28A2 can be parallel.

The straight portions of the first and second side sub-edges 28B1, 28B2 can be parallel.

The straight portions of the first and second feed sub-edges 28C1, 28C2 can be parallel.

The third and sixth connection points X3, X6 can both lie on a median thickness plane $P_T$.

A maximum thickness $T_M$ of the insert 14 is shown in FIG. 2B. The maximum thickness $T_M$ is measurable parallel to the median thickness plane $P_T$. For example, it can be measured between the third and sixth connection points X3, X6.

Reverting to FIG. 2C, a maximum rake surface length $L_{MR}$ is shown between diametrically opposed ends (e.g. 38C2, 38C4) of the straight portions 38S1, 38S2 of the first and second side sub-edges 28B1, 28B2.

A longitudinal rake surface length $L_{LR}$ on each rake surface can be measurable parallel to the median length plane $P_L$.

The maximum rake surface length $L_{MR}$ can be slightly greater than the longitudinal rake surface length $L_{LR}$. The longitudinal rake surface length $L_{LR}$ can also have a greater length than between any two other sub-edges (i.e. not between both side sub-edges 28B1, 28B2) of the first rake surface 18A.

A maximum height $H_M$ of the insert 14 is shown in FIG. 2B. The maximum height $H_M$ is measurable parallel to the rake axis $A_K$. For example it can be measured in the view shown in FIG. 2A, between point 48A (which is located at an intersection of the first cutting edge 26A and the median thickness plane $P_T$ in the view shown) and point 48B (which is located at an intersection of the second cutting edge 26B and the median thickness plane $P_T$ in the view shown).

One successfully tested design has the following lengths: the length $L_{S2}$ of each side sub-edge's straight portions can be 1 mm, and each overall length $L_{O2}$ can be 2.35 mm; the length $L_{S1}$, $L_{S3}$ of each ramping and feed sub-edge's straight portion can be 6.5 mm, and each overall length $L_{O1}$, $L_{O3}$ can be 7.8 mm. The maximum thickness $T_M$ can be 6.35 mm; the maximum rake surface length $L_{MR}$ can be 15.13 mm; the longitudinal rake surface length $L_{LR}$ can be 15.10 mm. The maximum height $H_M$ can be 9.5 mm.

It will be understood that an insert according to the subject matter of the present application may have different sizes. Nonetheless, proportional length ratios to those exemplified can be similar.

Referring to FIGS. 2A to 2C, it will be understood that portions of the first cutting edge 26A can extend different amounts from the median height plane $P_H$. For reference an extremity plane $P_E$ extending parallel to the median height plane $P_H$ and along an upper extremity of the insert 14A in FIG. 2B is shown.

The straight portions 40S1, 40S2 of the feed sub-edges 28C1, 28C2 can extend parallel to the extremity plane $P_E$.

At the discontinuity points 42D1, 42D3 where the ramping sub-edges 28A1, 28A2 transition from straight portions to corner portions, the first cutting edge 26A can be closest to the median height plane $P_H$. The general path of the first cutting edge 26A can be as follows: as the first ramping sub-edge 28A1 extends from the discontinuity point 42D1 to the sixth connection point X6 it can extend further from the median height plane $P_H$. From the sixth connection point X6 until the discontinuity point 46D2 the first feed sub-edge 28C1 can extend parallel to the extremity plane $P_E$. As the first feed sub-edge 28C1 starts to curve at the corner portion 40C2 thereof, the first cutting edge 26A can extend further towards the median height plane $P_H$ until it reaches low discontinuity point 42D3 of the second ramping sub-edge 28A2. From the discontinuity point $42_{D3}$ the first cutting edge 26A can again extend further from the median height plane $P_H$ until reaching the third connection point X3 (FIG. 2C), etc.

Figure 2E:
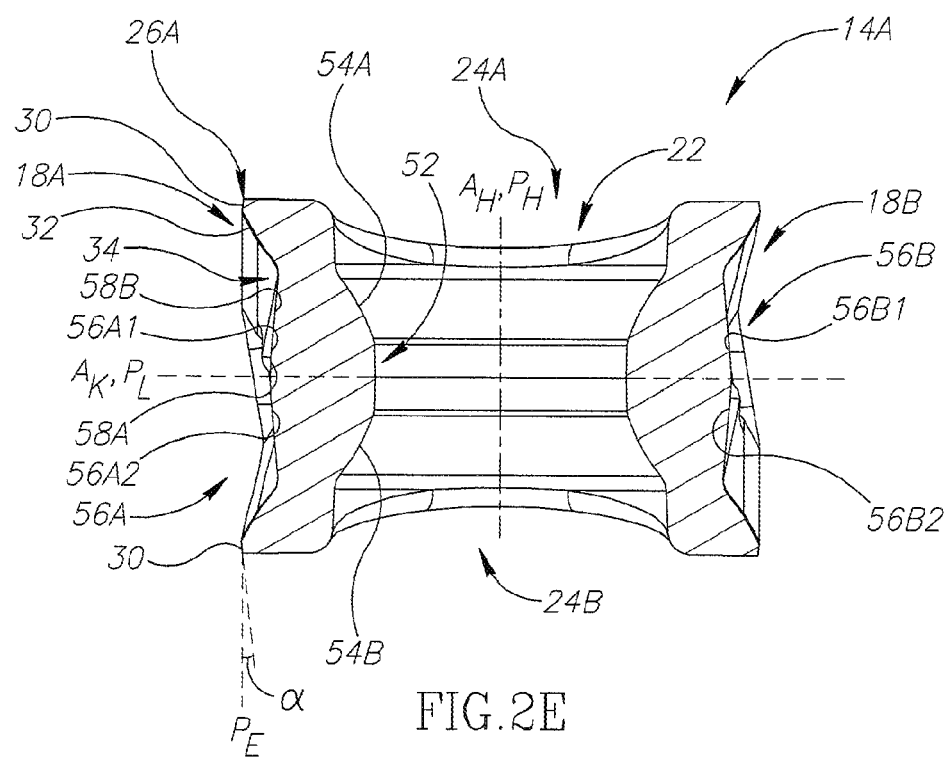
FIG. 2E is a sectional view taken along line 2E-2E in FIG. 2A.

In FIG. 2B, and best shown in FIG. 2E, the land 30 can form a land angle $\alpha$ with the extremity plane $P_E$. The land angle $\alpha$ can be 6°±10°. Such optional land is believed to assist in prolonging tool life for high-feed operations.

The insert peripheral surface 20 can comprise: a first ramping sub-surface 20A1; a first side sub-surface 20B1; a first feed sub-surface 20C1 connected to the first ramping sub-surface 20A1 and the first side sub-surface 20B1; a second ramping sub-surface 20A2 (FIG. 2D) connected to the first side sub-surface 20B1; a second side sub-surface 20B2 connected to the first ramping sub-surface 20A1; and a second feed sub-surface 20C2 connected to the second ramping sub-surface 20A2 (FIG. 2D) and second side sub-surface 20B2.

The first ramping sub-surface 20A1 can extend between opposing ramping and feed sub-edges. To elaborate, the first ramping sub-surface 20A1 can extend between the first ramping sub-edge 28A1 of the first cutting edge 26A and an opposing feed sub-edge 50C1 of the second cutting edge 26B. Similarly, the first feed sub-surface 20C1 can extend between opposing ramping and feed sub-edges 50A1, 28C1. It will be noted that the names "feed sub-surface" and "ramping sub-surface" do not necessarily indicate geometric differences. The second ramping and feed sub-surfaces extend in a similar manner.

The first side sub-surface 20B1 can extend between opposing side sub-edges 28B1, 28B3. The second side sub-surface 20B2 can extend between the other side sub-edges 28B2, 28B4.

Referring to FIG. 2C, the first ramping sub-edge 28A1 can form an insert ramping angle k0 with the median longitudinal plane $P_L$. The insert ramping angle k0 can be 15°.

The first feed sub-edge 28C1 can form an insert approach angle k1 with the median longitudinal plane $P_L$. The insert approach angle k1 can be 15°.

Referring also to FIG. 2C, the insert screw hole 22 can open out partially to each of the first and second ramping and feed sub-surfaces 20A1, 20A2, 20C1, 20C2.

In the view of FIG. 2B, a minimum screw hole thickness $T_{S1}$ of the insert screw hole 22 is shown. The screw hole thickness can increase to a maximum screw hole thickness $T_{S2}$ with increasing proximity to each of the first and second rake surfaces 18A, 18B.

Reverting to FIG. 2D, the insert screw hole 22 can have a central constricted portion 52 which increases in diameter with increasing proximity to the insert peripheral surface 20. Slanted, or more precisely frustoconical, screw abutment surfaces 54A, 54B can be located between the central constricted portion 52 and the insert peripheral surface 20.

Referring to FIG. 2E, each rake surface 18A, 18B can comprise a respective rake abutment surface 56A, 56B. Each rake abutment surface 56A, 56B can comprise first and second rake abutment sub-surfaces 56A1, 56A2, 56B1, 56B2 located on opposite sides of the median length plane $P_L$.

Each rake abutment sub-surface can be slanted such that with increasing proximity to the median length plane $P_L$ there is greater extension from a median height plane $P_H$. For example, the first rake abutment sub-surface 56A1 on the first rake surface 18A is shown with a first random location 58A close to the median length plane $P_L$ and a second random location 58B further therefrom. As shown, the first location 58A is further from the median height plane $P_H$ than the second location 58B.

Referring to FIG. 3B, the tool 12 can comprise a tool end surface 60 and a circumferentially extending tool peripheral surface 62 extending rearward therefrom.

The tool 12 can further comprise a flute 64 formed at an intersection of the tool end surface 60 and the tool peripheral surface 62 and extending rearward therefrom.

The tool 12 can further comprise an insert pocket 66 formed at an intersection of the tool end surface 60 and the tool peripheral surface 62, and opening out to the flute 64.

As the insert pockets 66 of the tool 12 can all be identical, reference will be made to either of the insert pockets 66 shown in FIG. 3B which show identical features from different views.

Referring also to FIG. 3D, the insert pocket 66 can comprise a pocket side surface 68, a pocket back surface 70, a pocket top surface 72, and a threaded pocket screw hole 73 opening out to the pocket top surface 72.

Noting the directions in FIG. 1B, it can be understood that: the pocket back surface 70 extends inwardly (i.e. in the inward direction $D_{IR}$) from the tool peripheral surface 62 and faces the rotation direction $D_{RO}$ (FIG. 1B); the pocket side surface 68 extends from the pocket back surface 70 to the flute 64 and faces outwardly (i.e. in the outward direction $D_{OR}$); the pocket top surface 72 extends inwardly (i.e. in the inward direction $D_{IR}$) from the tool peripheral surface 62 to the pocket side surface 68, and also extends from the pocket back surface 70 to the flute 64 (i.e. in the rotation direction $D_{RO}$).

The pocket side surface 68 can comprise a side abutment sub-surface 68A. The side abutment sub-surface 68A can extend perpendicular to the tool plane $P_{TL}$ (FIG. 1C).

The pocket back surface 70 can comprise a back abutment surface 70A.

The back abutment surface 70A can be formed with a back surface relief recess 70B dividing the back abutment surface 70A into two back abutment sub-surfaces 70C, 70D.

Referring also to FIG. 3C, the back abutment surface 70A can be axially located along at a lower half of an insert pocket 66 (e.g., lower than a bisection plane $P_B$ which extends perpendicular to a pocket screw hole axis $A_B$ and bisects the insert pocket from a highest point thereof, for example a top surface relief recess 82, to the lowest point thereof, for example the point designated 71 in FIG. 3C).

The back abutment sub-surfaces 70A, 70B can be slanted as shown. To provide an anti-slip effect, the back abutment sub-surface 70A, i.e. the back abutment sub-surfaces 70C, 70D thereof, can be slanted relative to the insert 14A. This can be achieved, for example, by slanting the back abutment sub-surfaces 70C, 70D relative to the pocket screw hole axis $A_B$. For illustrative purposes an additional axis $A_{B1}$, which is parallel to the pocket screw hole axis $A_B$, is shown to show a back abutment surface angle β relative to the pocket screw hole axis $A_B$. The back abutment surface angle β can be 10°.

The pocket top surface 72 can comprise first and second pocket top sub-surfaces 72A, 72B. The first and second pocket top sub-surfaces surfaces 72A, 72B can be mirror symmetric on each side of the pocket screw hole 73 (or more precisely mirror symmetric about a plane $P_S$ (FIG. 3B) bisecting the pocket screw hole 73 and extending perpendicular to the tool plane $P_{TL}$ and along the rotation direction). It can be understood that first and second pocket top sub-surfaces surfaces 72A, 72B can extend an equal radial distance $R_D$ (i.e. in a direction basically inward or outward of the tool, i.e. along a plane perpendicular to a rotation axis of the tool).

The first pocket top sub-surface 72A is shown adjacent to the tool peripheral surface 62 and extends more in the forward direction $D_F$ with increasing proximity to the tool peripheral surface 62. For example, a first random location 74A on the first pocket top sub-surface 72A is closer to tool peripheral surface 62 than a second random location 74B. As shown, the first location 74A extends further in the forward direction $D_F$ than the second random location 74B.

By contrast, the second pocket top sub-surface 72B (shown in FIG. 3B with a phantom line) can be adjacent to a pocket side surface 68 and extends more in the forward direction $D_F$ with increasing proximity thereto.

The first and second pocket top sub-surfaces 72A, 72B can extend more in the forward direction $D_F$ with increasing proximity to the flute 64. For example, a third random location 76A on the first pocket top sub-surface 72A (and directly adjacent the tool peripheral surface 62) is closer to the flute 64 than a fourth random location 76B (also directly adjacent to the tool peripheral surface 62). As shown, the third location 76A extends further in the forward direction $D_F$ than the fourth random location 76B.

Further, the first pocket top sub-surface 72A can form an internal acute first tool angle k2 with a plane $P_C$ that extends perpendicular to the rotation axis $A_R$. The first tool angle k2 can be 15.5°.

In the same view, the second pocket top sub-surface 72B can form an internal acute second tool angle k3 with the plane $P_C$. The second tool angle k3 can be 15.5°.

A sum of first and second tool approach angles k2, k3 (e.g., 31°) can be greater than a sum of insert ramping and approach angles k0, k1 (e.g., 30°). Alternatively stated, an external tool angle ϵ1 (FIG. 3B), e.g. 149°, can be smaller than an internal insert angle ϵ2 (FIG. 2C), e.g. 150°.

As a result, the insert peripheral surface 20, and more precisely the ramping and feed sub-surfaces (e.g., 20A1, 20C1) thereof are only configured for limited contact with the first and second pocket top sub-surfaces 72A, 72B. To elaborate, areas of the insert pocket 66 configured to abut the insert are shown as shaded regions in FIG. 3D. Notably, there are first and second theoretical contact lines 72C, 72D on the first and second pocket top sub-surfaces. These lines indicate regions of the insert 14A and the pocket top surface 72 which are configured to abut. It will be understood that because the sum of the tool angles (i.e., first and second tool approach angles k2, k3) are larger than the sum of the insert angles (i.e., insert ramping and approach angles k0, k1), then contact between the corresponding surfaces of each will be limited and not extend over the entire first and second pocket top sub-surfaces 72A, 72B. Even though larger contact areas are generally preferred, by having different angles less precision is required for insert manufacture, which is beneficial when pressing an insert to final dimensions.

By contrast, the other shaded regions shown 68A, 70C, 70D are visibly delimited sub-surfaces of the insert pocket 66.

The screw 16 can comprise a screw head 16A and an externally threaded shank 16B extending therefrom.

When the screw 16 secures the insert 14A to the insert pocket 66, as shown in FIG. 3C, the shank 16B is threadingly fastened to the pocket screw hole 73 and the screw head 16A abuts one of the screw abutment surfaces 54A of the ramping insert 14A.

The insert 14A and tool 12 are configured for contact of only the insert's insert peripheral surface 20 with the tool's pocket side surface 68 and first and second pocket top sub-surfaces 72A, 72B, and abutment of one of the ramping insert's rake surfaces 18B with the tool's pocket back surface 70.

More precisely, the insert 14A and tool 12 are configured for contact of only: the second side sub-surface 20B2 with the side abutment sub-surface 68A; the second ramping sub-surface 20A2 with the first pocket top sub-surface 72A; the second feed sub-surface 20C2 with the second pocket top sub-surface 72B; and the second rake surface 18B with the back abutment surface 70A.

More precisely, the second ramping sub-surface 20A2 can contact the first theoretical contact line 72C of the first pocket top sub-surface 72A, and the second feed sub-surface 20C2 can contact the second theoretical contact line 72D of the second pocket top sub-surface 72B.

Further, more precisely, exactly one of the rake abutment sub-surfaces 56B2 can contact both of the back abutment sub-surfaces 70C, 70D.

To ensure contact at the desired portions only, the insert pocket 66 can be formed with relief portions. To simplify insert manufacture, all of the relief portions of the assembly 10 can be formed on the tool 12.

For example, the pocket back surface 70 can have the above-mentioned back surface relief 70B. Referring briefly to FIG. 2C, it is noted that consequently a central portion 78 of the first rake surface 18A, which lies along the median thickness plane $P_T$ will not contact the pocket back surface 70 (since it will be adjacent the back surface relief 70B). However, first and second abutment portions 80A, 80B of the first rake surface 18A which are located on opposing sides of the central portion 78 will each respectively contact one of the back abutment sub-surfaces 70C, 70D.

The pocket top surface 72 can be formed with the top surface relief recess 82 located between first and second pocket top sub-surfaces 72A, 72B.

To further achieve desired contact, a lower relief region 84 can be formed underneath the back abutment surface(s) 70. Additionally, an upper relief region 86 can separate the pocket back and top surfaces 70, 72. Similarly, a first side relief region 88 can separate the pocket side and back surfaces. Similarly, a second side relief region 90 can separate the pocket side and top surfaces 68, 72.

Drawing attention to FIGS. 4A to 4D and FIG. 2C, it will be noted that the assembly 10 can carry out a number of different machining operations on a workpiece 92.

Figure 4A:
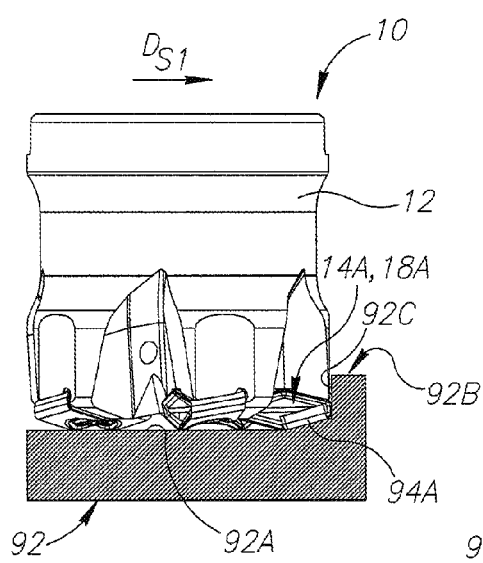
FIG. 4A is a side view of the assembly in FIGS. 1A to 1D performing a shouldering operation on a workpiece (i.e. removing material from the main surface but not the adjacent step)

The shouldering operation shown in FIG. 4A is carried out by moving the assembly 10 in a sideways direction $D_{S1}$ which is perpendicular to a lower surface 92A of the workpiece 92 being machined. As the assembly 10 is still spaced apart from an upwardly extending step 92B of the workpiece 92, and more precisely an upwardly projecting side surface thereof 92C, only the first feed sub-edge 28C1 of the insert 14A removes material from the workpiece 92. This is schematically shown by a chip 94A being removed by the first feed sub-edge 28C1 and flowing above the first rake surface 18A. Notably, the assembly 10 can remove material to a depth of cut $a_p$, shown in FIG. 1C. It will also be noted that the material removal can be carried out with a comparatively long portion of the cutting edge. More precisely, this operation can be carried out with a portion of the first cutting edge 26A extending from the sixth contact point X6 to the end of the straight portion 40S1 of the first feed sub-edge 28C1, namely the discontinuity point designated 46D2.

Figure 4B:
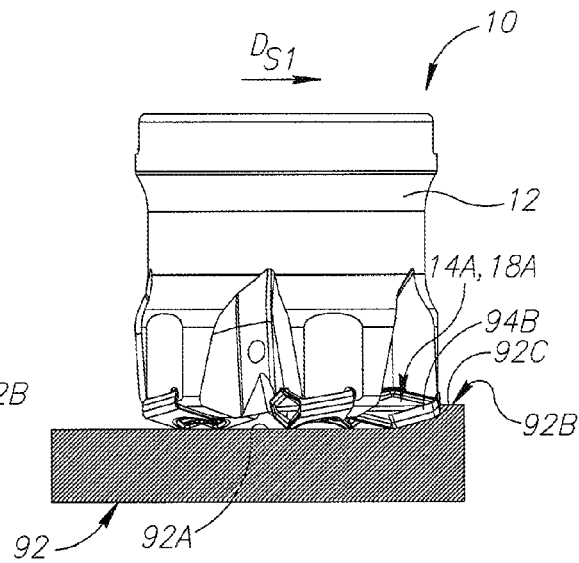
FIG. 4B is a side view of the assembly in FIGS. 1A to 1D performing a combined shouldering and facing operation on a workpiece (i.e. removing material from both the main surface and the adjacent step)

In FIG. 4B a combined shouldering and facing operation is shown, and is also carried out by also moving the assembly 10 in the sideways direction $D_{S1}$. The assembly 10 can simultaneously remove material from the adjacent step 92B, and more precisely the side surface 92C thereof, as well as from the lower surface 92A of the workpiece 92. This is schematically shown by a chip 94B, of different shape to the chip 94A in FIG. 4A, being removed by both the first feed sub-edge 28C1 and the first side sub-edge 28B1. It will also be noted that the material removal can be carried out with a comparatively long portion of the cutting edge. More precisely, this operation can be carried out with a portion of the first cutting edge 26A extending from the sixth contact point X6 to the end of the straight portion 38S1 of the first side sub-edge 28B1, namely the discontinuity point designated 44D2.

Figure 4C:
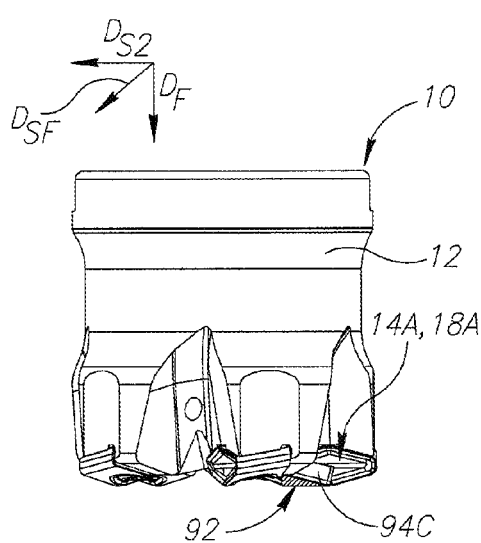
FIG. 4C is a side view of the assembly in FIGS. 1A to 1D performing a ramping operation on a partially shown main surface of a workpiece.

A ramping operation is shown in FIG. 4C, in which the assembly 10 moves simultaneously in both a sideways direction $D_{S2}$ and the forward direction $D_F$. Stated differently, the assembly 10 moves in a sideways-forward direction $D_{SF}$. During this motion, the first ramping sub-edge 28A1 removes material from the workpiece 92, schematically shown by a chip designated 94C. It will be noted that the insert 14A is capable of removing a comparatively large chip during ramping, due to the comparatively large ramping sub-edge thereof. It will also be noted that the material removal can be carried out with a comparatively long portion of the cutting edge. More precisely, this operation can be carried out with a portion of the first cutting edge 26A extending from the sixth contact point X6 to the end of the straight portion 36S1 of the first ramping sub-edge 28A1, namely the discontinuity point designated 42D1.

Figure 4D:
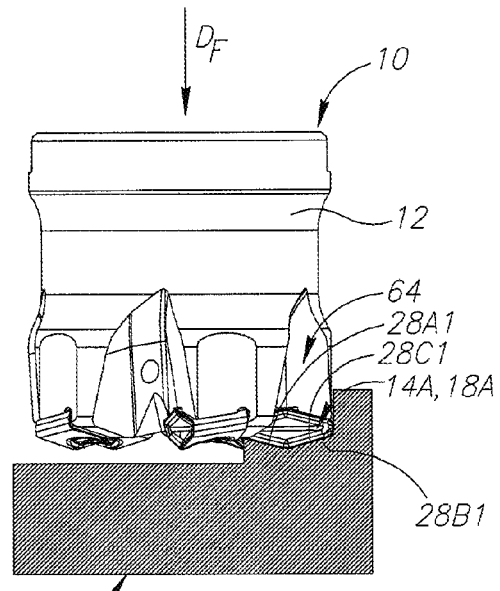
FIG. 4D is a side view of the assembly in FIGS. 1A to 1D performing a plunging operation on a workpiece (yet unlike FIGS. 4A to 4C this view does not show a chip)

A plunging operation is shown in FIG. 4D, in which the assembly 10 moves in the forward direction $D_F$. During such motion, each of the first side sub-edge 28B1, the first feed sub-edge 28C1 and even the first ramping sub-edge 28A1, if there is material thereunder, can removes material from the workpiece 92. While the comparatively large insert ramping and approach angles k0, k1 may reduce surface finish, this may be offset by ramping and feed operation capability. It will also be noted that the material removal can be carried out with a comparatively long portion of the cutting edge. More precisely, this operation can be carried out with a portion of the first cutting edge 26A extending from the end of the straight portion $38_{S1}$ of the first side sub-edge 28B1, namely the discontinuity point designated 44D2, to the end of the straight portion 36S1 of the first ramping sub-edge 28A1, namely the discontinuity point designated 42D1.

Figure 5A:
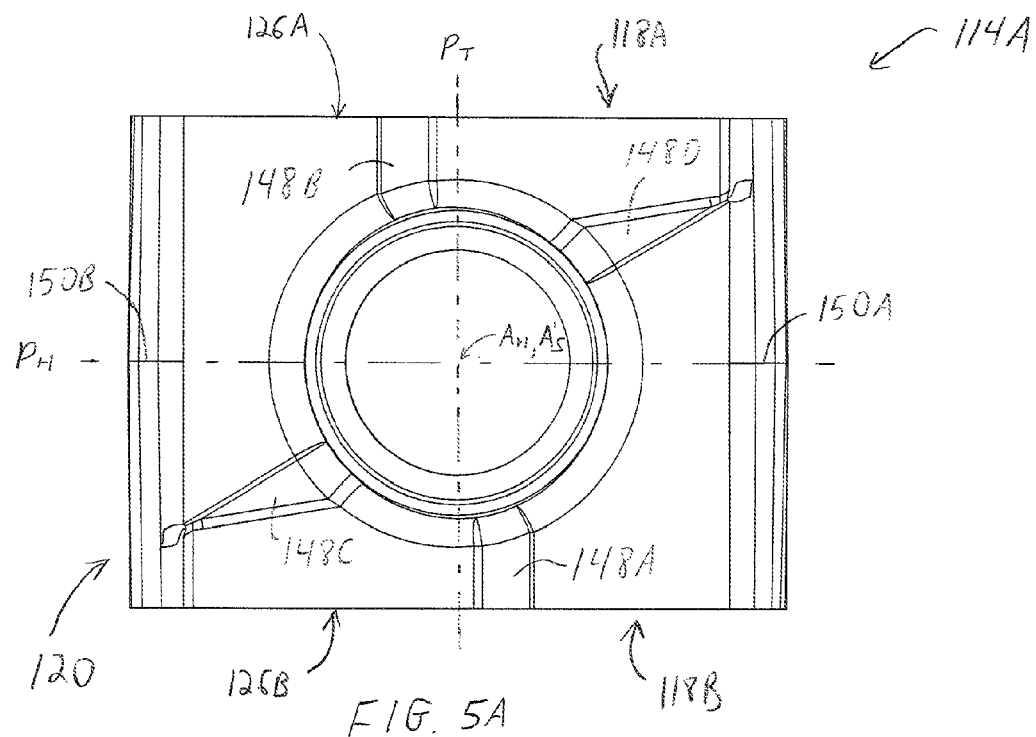
FIG. 5A is a top view of another embodiment of a ramping insert.
Figure 5B:
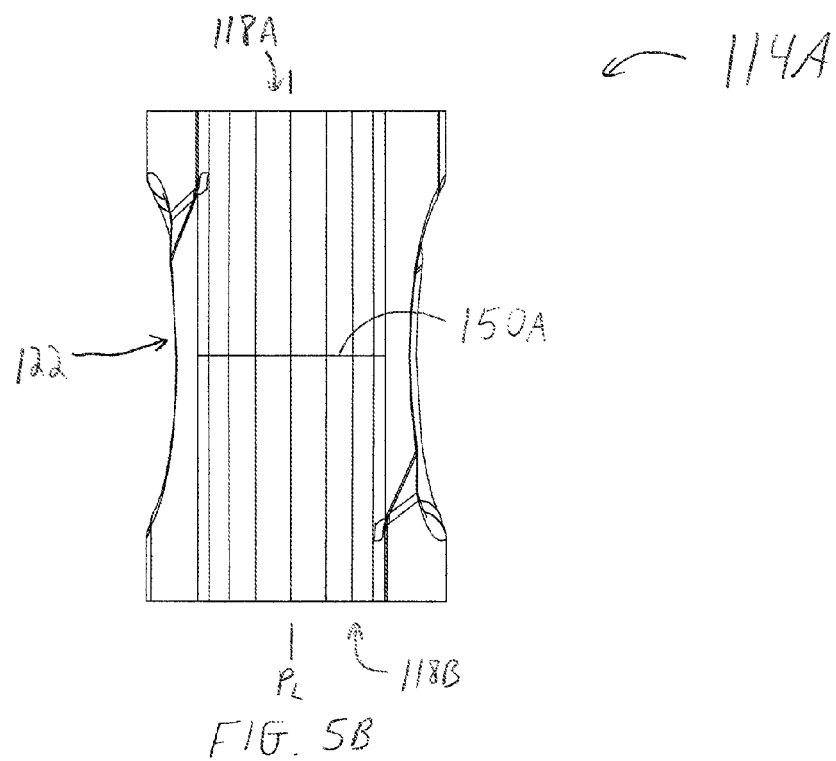
FIG. 5B is a side view of the ramping insert in FIG. 5A.
Figure 5C:
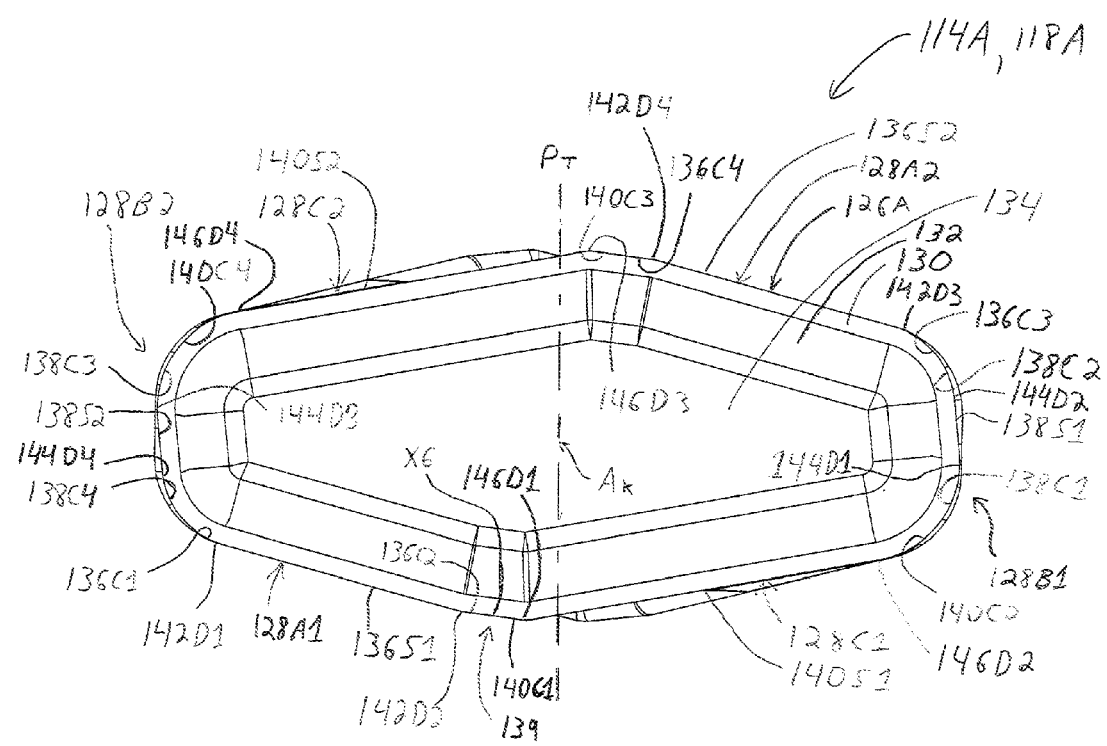
FIG. 5C is front view of the ramping insert in FIGS. 5A and 5B, this figure can also be considered as a view perpendicular to a rake surface (i.e. a view along a rake axis)

Referring now to FIGS. 5A to 5C, alternative insert features will be shown.

Except where explicitly stated or clearly shown, said features of an exemplified insert 114A should be considered to correspond to the previously described insert 14A, and, to remove any doubt, insert 114A is configured to carry out the same operations.

The insert 114A can comprise opposing first and second rake surfaces 118A, 118B and an insert peripheral surface 120 connecting the first and second rake surfaces 118A, 118B.

The insert 114A can be formed with an insert screw hole 122 opening out to opposing sides of the insert peripheral surface 120.

A first cutting edge 126A can extend along an intersection of the insert peripheral surface 120 and the first rake surface 118A. A second cutting edge 126B can extend along an intersection of the insert peripheral surface 120 and the second rake surface 118B.

The first and second cutting edges 126A, 126B can be identical and can be considered to have all features mentioned hereinbelow in connection with the other.

Also, the first and second rake surfaces 118A, 118B can be identical and can be considered to have all features mentioned herein below with the other.

The first cutting edge 126A can comprise a first ramping sub-edge 128A1; a first side sub-edge 128B1; a first feed sub-edge 128C1 connected to the first ramping sub-edge 128A1 and first side sub-edge 128B1; a second ramping sub-edge 128A2 connected to the first side sub-edge 128B1; a second side sub-edge 128B2 connected to the first ramping sub-edge 128A1; and a second feed sub-edge 128C2 connected to the second ramping sub-edge 128A2 and second side sub-edge 128B2.

The first rake surface 118A can comprise a land 130 extending inwardly from the first cutting edge 126A.

Further inward of the land 130 can be a sloping portion 132 that extends between the land 130 and a central rake surface region 134. A difference to the above described insert 14A can be that each central rake surface region 134 of the insert 114A can be planar.

As shown best in FIG. 5C, the ramping and feed sub-edges 128A1, 128A2, 128C1, 128C2 converge with increasing proximity to the side sub-edge 128B1, 128B2 to which they are both connected. For example, the first feed sub-edge 128C1 is closer to the second ramping sub-edge 128A2 with increasing proximity to the first side sub-edge 128B1.

The insert 114A can comprise a rake axis $A_K$ extending through a center of, and perpendicular to, the first and second rake surfaces 118A, 118B (FIG. 5C).

A median length plane $P_L$ (FIG. 5B) can bisect the first and second rake surfaces 118A, 118B along a longitudinal dimension thereof.

A median thickness plane $P_T$ can extend perpendicular to the median length plane $P_L$ and can also bisect the first and second rake surfaces 118A, 118B.

Referring to FIG. 5A, a median height plane $P_H$ can extend perpendicular to the median length and thickness planes $P_L$, $P_T$ and can also bisect the insert 114A.

A height axis $A_H$ can extend perpendicular to the rake axis $A_K$ and can extend along an intersection of the median thickness and height planes $P_T$, $P_H$.

The insert screw hole 122 can be in the center of the insert 114A, and an insert screw hole axis $A_S$ can be coaxial with the height axis $A_H$.

The insert 114A can be configured for two indexable positions. For example, the insert 114A can be 180° rotationally symmetric about the rake axis $A_K$.

The insert 114A can be configured to be reversed, allowing two additional indexable positions. For example, the insert 114A can also be 180° rotationally symmetric about the height axis $A_H$.

Referring to FIG. 5C, each ramping sub-edge 128A1, 128A2 can comprise a straight portion 136S1, 136S2. Each ramping sub-edge 128A1, 128A2 can comprise a pair of corner portions 136C1, 136C2, 136C3, 136C4 connected to each side of the straight portions 136S1, 136S2.

Each side sub-edge 128B1, 128B2 can comprise a straight portion 138S1, 138S2. Each side sub-edge 128B1, 128B2 can comprise a pair of corner portions 138C1, 138C2, 138C3, 138C4 connected to each side of the straight portions 138S1, 138S2.

Each feed sub-edge 128C1, 128C2 can comprise a straight portion 140S1, 140S2. Each ramping sub-edge 128C1, 128C2 can comprise a pair of corner portions 140C1, 140C2, 140C3, 140C4 connected to each side of the straight portions 140S1, 140S2.

Each straight portion (136S1, 136S2, 138S1, 138S2, 140S1, 140S2) ends at discontinuity points (142D1, 142D2, 142D3, 142D4, 144D1, 144D2, 144D3, 144D4, 146D1, 146D2, 146D3, 146D4), i.e. where the edge transitions to extend in a different direction.

The current example insert 114A differs from the previously described insert 14A in that the corner portions connecting the ramp and feed sub-edges are not curved but are sharp corner portions (whereas insert 14A exemplifies an insert with all of the corner portions being curved).

To elaborate, the ramping sub-edge 128A1 comprises the sharp ramp corner portion 136C2 and the feed sub-edge 128C1 comprises the sharp feed corner portion 140C1. A connection point X6 is located in the middle of a corner formed by the adjacent sharp corner portions 136C2, 140C1.

Figure 5D:
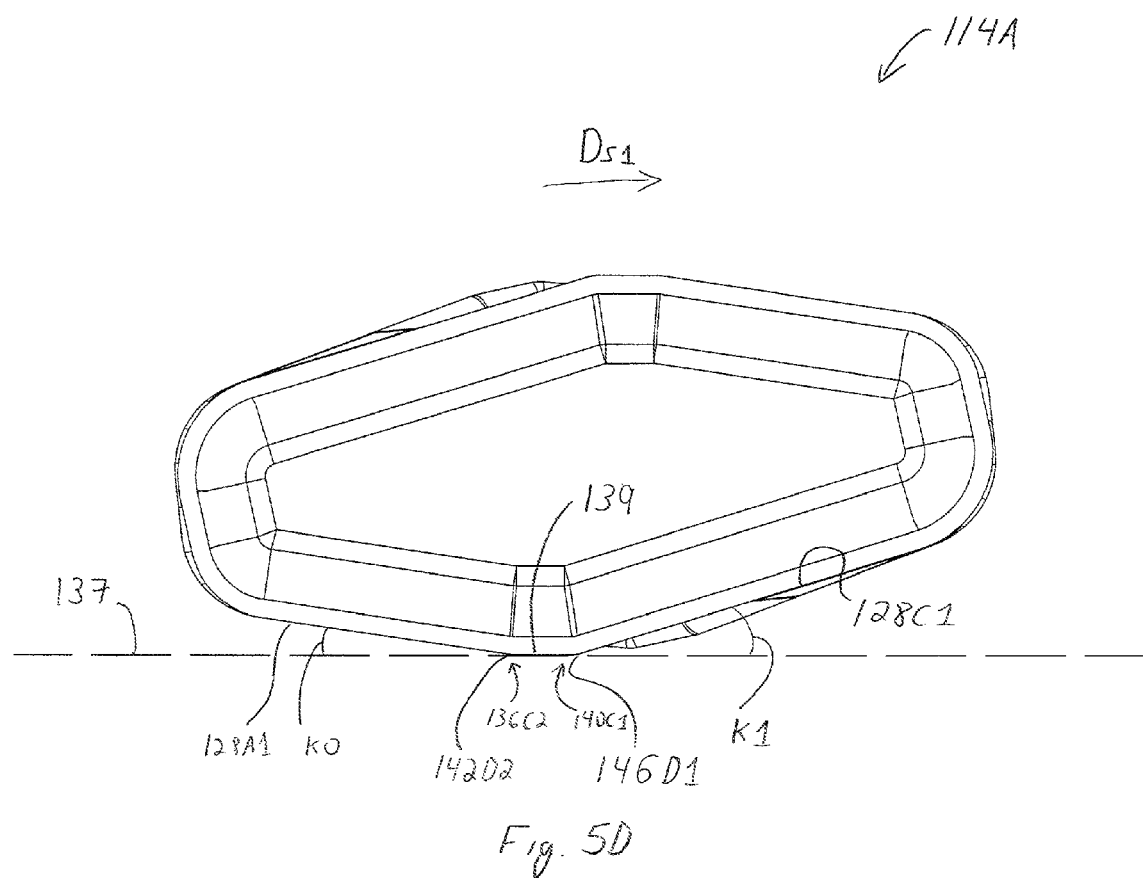
FIG. 5D is a similar view to FIG. 5C except that the ramping insert is oriented in an operative position relative to a workpiece surface.

Drawing attention to FIG. 5D, elaborating by way of example with regard to one of the feed corner portions 140C1 and the adjacent ramp corner portion 136C2, it is shown that both having sharp shapes or, stated differently, sharp corner edges resulting in a straight extension 139. Stated differently, a straight extension 139 can extend between the adjacent ramp and feed discontinuity points 142D2, 146D1.

An insert comprising such straight extension 139 (or, alternatively stated, comprising sharp adjacent feed and ramp corners) can be oriented as shown with the straight extension 139 being parallel, or substantially parallel, with the surface 137 being machined.

Preferably the straight extension 139 can be oriented such that the feed corner portion 136C1 is slightly further than the ramp corner portion 136C2 from the surface 137 (even though the difference is an amount measured in microns, preferably between 5 to 25 microns, and hence is not visible at this magnification, and could also therefore be considered parallel or substantially parallel).

As the insert 114A is moved in the sideways direction $D_{S1}$ the finish of the surface 137 can be slightly improved.

Nonetheless, it will be noted that such inserts and tools are intended for high-feed operations (noting that also the previously described insert could alternatively be provided with sharp adjacent feed and ramp corners, without any other modifications needed) and therefore the surface finish may still be far inferior than to inserts and tools intended for non-roughing operations.

It will also be noted that providing sharp edges could also be expected to provide inferior tool life, nonetheless, the slight improvement in finish is believed to offset any possible disadvantage of tool life.

Finally, it is noted that only sharp corner portions are provided (e.g. different to the straight the side sub-edges 128B1, 128B2 that were additionally provided a straight portion 138S1, 138S2 in addition to their corner portions 138C1, 138C2, 138C3, 138C4). Consequently, the feed and ramp sub-edges have not been shortened for such function. Preferably the straight extension 139 can have a length between 0.5 mm to 2.0 mm. Values closer to 0.5 mm are preferred for the abovementioned reason.

As shown, in difference to the previous insert 14A, the currently exemplified insert 114A has longer feed sub-edges than ramping edges. This is connected only with a desired to increase cutting depth to compensate for a smaller tool diameter (not shown) for which the exemplified insert 114A is designed.

It will be understood an insert resembling the previous insert 14A could be modified to have sharp corner portions at adjacent ramp and feed sub-edges thereof, and could have equal length or different length ramp and feed sub-edges, since the corner portion shape and sub-edge lengths are independent of each other.

Similar to the previously described insert 14A, the straight portions of the sub-edges can be parallel. However, as shown e.g. in FIG. 5C, a result of the feed and ramp sub-edges being of unequal length is that the first and second cutting edges 126A, 126B may be slightly out of phase with each other. A similar consequence is shown in FIG. 5A by way of minor distortions 148A, 148B, 148C, 148D in otherwise planar portions of the peripheral surface 120. Nonetheless, such unequal lengths can complicate manufacture, which has resulted in a split die manufacturing design, resulting in the parting lines 150A, 150B visible in FIG. 5A.

One example set of relative dimensions can be as follows: the length of each side sub-edge's straight portion can be 0.45 mm; the length of each ramping feed sub-edge's straight portion can be 2.5 mm; the length of each feed sub-edge's straight portion can be 3.6 mm. A distance between the discontinuity points 146D1, 142D2 can be 0.6 mm. A radius curvature of the corner between the straight portions of the side sub-edge and ramping sub-edge can be 0.85 mm, and a radius curvature of the corner between the straight portions of the side sub-edge and feed sub-edge can be 1.00 mm.

Yet a further point of difference, shown in FIGS. 5A and 5B, can be that the exemplified cutting edges 126A, 126B can each lie in a single plane, rather than comprising portions being different distances from the height plane $P_H$.

Referring to FIG. 5D, as the insert will be oriented in a non-parallel manner to a workpiece, the following angles will be made with reference to the workpiece surface 137. The first ramping sub-edge 128A1 can form an insert ramping angle k0 with the surface 137 of 8.5°. The first feed sub-edge 128C1 can form an insert approach angle k1 with the surface 137 of 17°. Stated differently, the insert approach angle k1 is approximately twice the angular extension of the insert ramping angle k0. Preferably, the insert approach angle k1 is within the range 17°±3°.

The description above includes an exemplary embodiment and details, and does not exclude non-exemplified embodiments and details from the claim scope of the present application.

What is claimed is:

1. A ramping insert comprising:
opposing first and second rake surfaces; an insert peripheral surface connecting the first and second rake surfaces; an insert screw hole opening out to opposing sides of the insert peripheral surface, the insert screw hole having an insert screw hole axis; and first and second cutting edges extending along an intersection of the insert peripheral surface and a corresponding one of the first and second rake surfaces;
each of the first and second cutting edges comprising:
a first ramping sub-edge; a first side sub-edge; a first feed sub-edge connected to the first ramping sub-edge and the first side sub-edge; a second ramping sub-edge connected to the first side sub-edge; a second side sub-edge connected to the first ramping sub-edge; and a second feed sub-edge connected to the second ramping sub-edge and the second side sub-edge;
wherein:
each of the ramping and feed sub-edges is longer than each of the side sub-edges; a maximum rake surface length of each rake surface is measurable between the first and second side sub-edges thereof, and each of the ramping and feed sub-edges converge with increasing proximity to the side sub-edge to which they are both connected;
wherein:
each ramping sub-edge comprises a sharp ramp corner portion, said sharp ramp corner portion being a corner portion of the ramping sub-edge closest to a feed sub-edge; each feed sub-edge comprises a sharp feed corner portion adjacent to one of said sharp ramp corner portions; and a connection point of the ramping sub-edge to the feed sub-edge is located in the middle of a corner formed by the adjacent corner portions.

2. The ramping insert according to claim 1, wherein connection points of adjacent ramping and feed sub-edges are located on different sides of a median thickness plane.

3. The ramping insert according to claim 1, wherein the feed sub-edges are longer than the ramping sub-edges.

4. The ramping insert according to claim 1, wherein the insert peripheral surface is devoid of relief portions.

5. The ramping insert according to claim 1, wherein each side sub-edge comprises a straight portion.

6. The ramping insert according to claim 5, wherein the straight portions of the side sub-edges on the first and second rake surfaces are parallel to the straight portions on only the same rake surface.

7. The ramping insert according to claim 5, wherein the straight portions have a length which is 15%±5% of a maximum thickness of the insert measurable parallel to the median thickness plane.

8. The ramping insert according to claim 5, wherein the straight portions have a length which is 13%±5% of an overall length of the ramping sub-edge and/or a length which is 13%±5% of an overall length of the feed sub-edge.

9. The ramping insert according to claim 1, further comprising:
a maximum height which is measurable parallel to a rake axis extending through a center of the first and second rake surfaces; and a maximum thickness of the ramping insert which is measurable parallel to the median thickness plane; the maximum height is greater than the maximum thickness.

10. The ramping insert according to claim 1, wherein the insert is 180° rotationally symmetric about a rake axis extending through the center of the first and second rake surfaces and/or 180° rotationally symmetric about a height axis perpendicular to the rake axis and extending along an intersection of median thickness and height planes.

11. The ramping insert according to claim 1, wherein a central rake surface region of each rake surface is planar.

12. The ramping insert according to claim 1, wherein a straight extension defined between discontinuity points of the sharp ramp and feed corner portions has a length between 0.5 mm to 2.0 mm.

13. The ramping insert according to claim 12, wherein the straight extension has a length less than 0.75 mm.

14. The ramping insert according to claim 1, wherein a straight extension defined between discontinuity points of the sharp ramp and feed corner portions has a length smaller than a quarter of the length of a straight portion of the feed sub-edge comprising the sharp feed corner portion.

15. The ramping insert according to claim 14, wherein a straight extension defined between discontinuity points of the sharp ramp and feed corner portions has a length smaller than or equal to a sixth of the length of the straight portion of the feed sub-edge comprising the sharp feed corner portion.

16. The ramping insert according to claim 1, wherein a straight portion of the ramping sub-edge has a length of 70%±15% of the length of a straight portion of the adjacent feed sub-edge.

17. The ramping insert according to claim 1, wherein each of the first and second cutting edges lies in a plane.

\* \* \* \* \*